United States Patent
Kesterson et al.

[15] 3,660,105
[45] May 2, 1972

[54] CITRUS SEED CLOUDING AGENT FOR BEVERAGE BASES AND FOOD PRODUCTS

[72] Inventors: James W. Kesterson, Winter Haven, Fla.; Rudolph Hendrickson, deceased, late of Lake Alfred, Fla. by Rosalind A. Hendrickson, heir; Cedric D. Atkins, Winter Haven, Fla.

[73] Assignee: State of Florida, Department of Citrus

[22] Filed: July 25, 1969

[21] Appl. No.: 844,984

[52] U.S. Cl. .................. 99/28, 99/105, 99/134, 99/129, 99/19, 252/311
[51] Int. Cl. .................. A23l 1/00, B01j 13/00
[58] Field of Search .......... 99/204, 205, 103, 105, 28, 99/78, 140, 17; 252/312, 311; 260/412.2, 412.4

[56] References Cited

UNITED STATES PATENTS

| | | | |
|---|---|---|---|
| 1,500,670 | 7/1924 | De Groote | 99/28 |
| 2,893,869 | 7/1959 | Beck et al. | 99/78 |
| 2,929,719 | 3/1960 | Walburn | 99/205 |
| 3,037,975 | 6/1962 | Cohn | 99/105 |
| 3,353,961 | 11/1967 | Simon | 99/78 |
| 3,404,990 | 10/1968 | Stampe | 99/105 |

OTHER PUBLICATIONS

Hackh's Chemical Dictionary 4th Ed. Grant McGraw-Hill N.Y. 1969 p. 4

Primary Examiner—Norman Yudkoff
Assistant Examiner—Hiram H. Bernstein
Attorney—James J. Brown

[57] ABSTRACT

Clouding agents are prepared from the whole seed kernels of citrus fruits by preparing a paste from the whole seed kernels, partially defatted seed kernels, seed meal in combination with citrus seed oil or other fats, and combining these agents with water, gum acacia and the flavor oil from the citrus fruit to form an emulsion.

11 Claims, 1 Drawing Figure

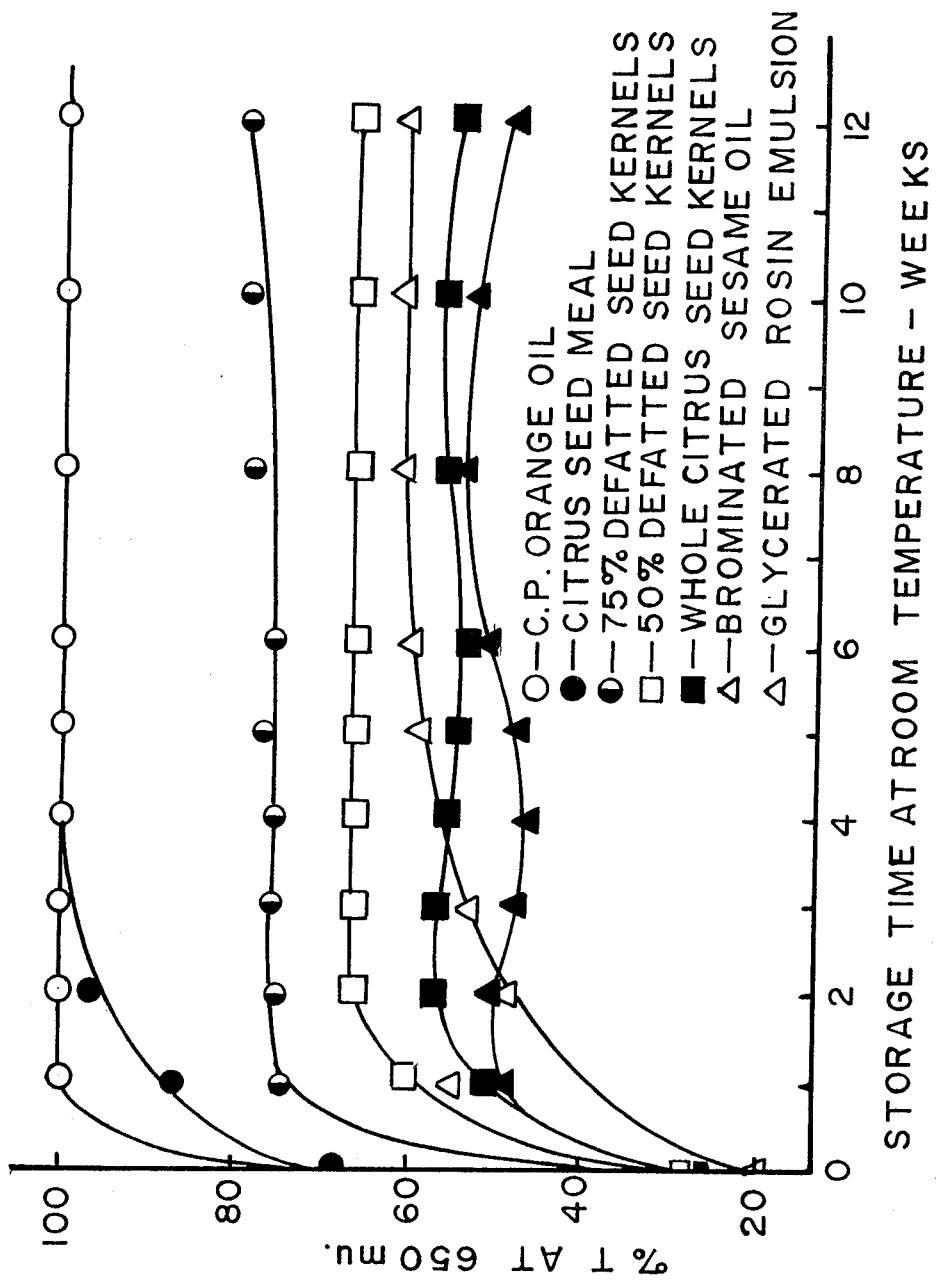

CITRUS SEED CLOUDING AGENT FOR BEVERAGE BASES AND FOOD PRODUCTS

This invention relates to a new clouding agent for food products and a method for making the clouding agent. More particularly, this invention relates to the manufacture of effective clouding agents from the whole seed kernels or partially defatted seed kernels of citrus fruits and in particular, oranges, grapefruits, tangerines, lemons and limes.

It is known in the art to employ various clouding agents in beverages in order to give a "natural" turbidity to the final drink. Two of the most commonly used clouding agents for this purpose are brominated seed oils and glycerated rosin.

U.S. Pat. No. 3,404,990 to Villadsen et al. discloses employing an agent for imparting stable cloudiness which consists of fine particles of natural citrus fruit cloudifier and natural citrus fruit coloring matter derived or extracted from the peels and/or rags of citrus fruits.

U.S. Pat. No. 2,995,448 to Kew et al. discloses stabilizing the cloud in citrus juices by incorporating a water extract of grape leaves.

Finally, U.S. Pat. No. 1,955,849 to Finley discloses employing colloids which are capable of forming gels into citrus juices to stabilize the suspension.

According to the present invention, it has been found that superior cloud retention is obtained in beverages by the inclusion of minor amounts of an emulsion made from the whole seed kernels of citrus fruits. The whole seed kernel emulsion of this invention is prepared by a process which comprises the steps of washing citrus seeds, which can conveniently be obtained from commercial citrus juice processing plants, to remove rag and pulp particles. Lime, $Ca(OH)_2$, can also be used in the wash to eliminate the slimy coating that surrounds the seeds. The seeds are then screened, for example, over a ¼-inch hardware cloth or other suitable screen, washed, rinsed, and drained, and finally dried in a drier that is suitable, for example, for dehydrating citrus pulp. The exhaust temperature of the drier should be kept sufficiently low to prevent charring and darkening of the seed kernels. The moisture content of the whole dried seeds is reduced to a level that will permit the seeds to be handled effectively without heating or molding. Hulls are then removed from the whole seeds by a suitable process, such as flaking and screening, etc., that will give a clean seed kernels. The seed kernels are then ground and mashed into a paste from which the final emulsion is prepared. If desired, the seed kernels can also be defatted and de-bittered by solvent extraction. This seed clouding agent can then be combined with citrus seed oil or other fats to give the desired cloud to the beverage.

The emulsion of this invention, which is effective as a clouding agent in beverages etc., comprises an aqueous emulsion containing about 3–8 weight percent of the whole citrus seed kernel paste, preferably about 5–6 weight percent, and about 3–8 weight percent, preferably 5–6 weight percent gum acacia. About 4–9 weight percent of a suitable flavoring oil, for example, derived from the same fruit as the seeds, can also be added. Sufficient coloring matter to impart the desired natural tint to the emulsion can also be included. For example, about 1.5 to 4 weight percent food dye can be dissolved in about 10 weight percent propylene glycol. All weight percents are based on the total weight of the final aqueous emulsion.

The emulsions can advantageously be prepared in accordance with the following procedure: (1) Weigh out the amount of gum acacia, clouding agent and wet with the flavoring oil. (2) Add 100 ml water and thoroughly mix. (3) Dissolve the coloring matter in the propylene glycol and add 50 ml water. (4) Add this mixture to the oil-gum-water base mixture and mix with sufficient water to give 238 ml (8 oz). (5) Pass the entire mixture through a colloid mill in order to properly disperse the emulsion and reduce the particle size to 2 microns or less. This formulation can be used in the ratio of 2 ounces of emulsion to 1 gallon of syrup.

In a preferred embodiment of the present invention it has been found advantageous to reduce the fact content of the seed kernels preferably by about 50 percent to aid in reduction of ring formation upon storage of the emulsion. This ring formation has been found in all drinks which contain citrus seed meal and various fat as well as glycerated rosin emulsion. Generally this problem is greater with increased fat content in the emulsion. Ring formation can be also reduced by the inclusion in the finished emulsion of about 2.5 weight percent polyoxyethylene sorbitan monooleate or any other suitable dispersant which solubilizes the fat as well as the flavoring oil.

Where reduction in the fat content of the seed kernels is desired, this can be effected by first solvent extracting substantially all of the seed oil from the seed and then reconstituting the defatted seed meal with a reduced amount of original seed oil or other fatty material. A suitable solvent, for example, for this solvent extraction is acetone, hexane, etc.

Cloud retention of these various products prepared as shown in Table 1 was compared measuring the percent light transmittance in a Fisher Electrophotometer II with a 650 m$\mu$ filter. Distilled water was used as a 100 percent transmittance blank. Beverages prepared in accordance with the formula shown in Table 1 were run in triplicate and the average values for percent light transmittance as related to time of storage are given in Table 2. These data show that the beverages utilizing whole citrus seed kernels and glycerated rosin emulsion gave the best retention of cloud as determined by the percent light transmittance at 650 m$\mu$. The degree of clarification in these two products was less than 59 percent. Citrus seed meal plus 50 percent of the seed oil normally present in whole seed ker-

TABLE 1.—FORMULATION FOR CITRUS BEVERAGES

| | Basic orange oil emulsion | | | | | | |
|---|---|---|---|---|---|---|---|
| | Control | Brominated sesame oil | Glycerated rosin emulsion | Citrus seed meal | 75% defatted citrus seed meal | 50% defatted citrus seed meal | Whole citrus seed kernels |
| Florida orange oil, g | 15.60 | 15.60 | 15.60 | 15.60 | 15.60 | 15.60 | 15.60 |
| Brominated Sesame oil, g | | 8.80 | | | | | |
| Whole citrus seed kernels, g | | | | | | | 13.00 |
| Citrus Seed meal, g | | | | 5.00 | 5.00 | 5.00 | |
| Citrus Seed oil, g | | | | | 2.00 | 4.00 | |
| Gum acacia, g | 13.65 | 13.65 | 13.65 | 13.65 | 13.65 | 13.65 | 13.65 |
| Food color | 6.30 | 6.30 | 6.30 | 6.30 | 6.30 | 6.30 | 6.30 |
| Propylene glycol, ml | 23.70 | 23.70 | 23.70 | 23.70 | 23.70 | 23.70 | 23.70 |
| Water, 8 oz., to make, ml | 238 | 238 | 238 | 238 | 238 | 238 | 238 |
| Bottling syrup | | | | | | | |
| Emulsion, ml | 3.7 | 3.7 | 3.7 | 3.7 | 3.7 | 3.7 | 3.7 |
| Citric acid (50%), ml | 3.7 | 3.7 | 3.7 | 3.7 | 3.7 | 3.7 | 3.7 |
| Glycerated Rosin Emulsion, ml | | | 0.9 | | | | |
| Sodium benzoate, g | 0.24 | 0.24 | 0.24 | 0.24 | 0.24 | 0.24 | 0.24 |
| 32° Be syrup, 8 oz., to make, ml | 238 | 238 | 238 | 238 | 238 | 238 | 238 |
| Beverages | | | | | | | |

1¾ oz. (52 ml.) bottling syrup to a 12 oz. (355 ml.) bottle Sodium benzoate: 0.29 g./12 oz. (355 ml.) 1/10 of 1% as preservative. Carbonated water: 1½ to 2 vol. gas.

TABLE 2

[Comparison of cloud retention in citrus beverages utilizing citrus seed and commercial clouding agents]

| Fisher electrophotometer II | Percent T at 650 mμ | | | | | | | | | |
|---|---|---|---|---|---|---|---|---|---|---|
| Storage time at room temp., wks | 0 | 1 | 2 | 3 | 4 | 5 | 6 | 8 | 10 | 12 |
| C. P. Florida orange oil | 63.0 | 100.0 | 100.0 | 100.0 | 100.0 | 100.0 | 100.0 | 100.0 | 100.0 | 100.0 |
| Citrus seed meal | 67.8 | 86.5 | 96.3 | 98.9 | 98.9 | 99.0 | 99.6 | 99.2 | 99.3 | 99.7 |
| Citrus seed meal plus 25% seed oil | 28.2 | 74.5 | 75.5 | 96.0 | 75.5 | 76.8 | 76.3 | 78.2 | 79.1 | 79.8 |
| Citrus seed meal plus 50% seed oil | 26.3 | 60.3 | 67.0 | 66.5 | 65.5 | 66.3 | 66.4 | 66.1 | 65.6 | 65.7 |
| Whole citrus seed kernels | 24.6 | 50.5 | 56.8 | 56.6 | 54.7 | 54.4 | 52.8 | 56.6 | 56.3 | 54.3 |
| Brominated sesame oil | 19.7 | 55.1 | 47.8 | 53.3 | 55.3 | 58.3 | 60.2 | 61.2 | 61.8 | 61.3 |
| Glycerated rosin emulsion | 28.3 | 49.8 | 49.7 | 48.0 | 46.6 | 47.7 | 52.1 | 54.6 | 54.1 | 48.8 |

Percent light transmittance (T) is the average value for triplicate runs.

nels was equivalent to brominated sesame oil and gave light transmittance values less than 69 percent which are considered to show only slight clarification. The 75 percent defatted citrus seed meal showed definite clarification while completely defatted citrus seed meal and coldpressed Florida orange oil by itself showed extreme clarification and were considered unsatisfactory for beverage use.

The examples shown demonstrate the effectiveness of citrus seed clouding agents in beverages. However, for the purpose of this invention, these products are not solely limited to beverages; since, they are a natural food constituent and may be used in any other food product where cloud is desirable; such as pickles, candies, jams, and jellies, dairy products, etc.

It is claimed:

1. A clouding agent for foodstuffs, comprising an aqueous emulsion which comprises about 3-8 weight percent ground whole citrus seed kernels and about 2-8 weight percent gum acacia, said citrus seed kernels having had rag and pulp particles removed therefrom.

2. The clouding agent of claim 1 which contains about 5-6 weight percent whole citrus seed kernels and about 5-6 weight percent gum acacia.

3. The clouding agent of claim 1 which also contains 4-9 weight percent flavoring oil and about 1.5 to 4 weight percent coloring matter.

4. The clouding agent of claim 1 wherein the fat content of the seed kernels has been reduced by about 50 percent.

5. The clouding agent of claim 1 wherein the citrus seed kernels are derived from citrus fruits selected from the group consisting of oranges, grapefruit, tangerines, lemons and limes.

6. The clouding agent of claim 3 wherein the seed kernels and the flavoring oil are derived from oranges.

7. A process for preparing clouding agents for foodstuffs which comprises washing whole citrus seed kernels to remove rag and pulp particles, screening and drying said whole citrus seeds, removing the hulls from said seeds, grinding the resulting seed kernels into a paste, and forming an aqueous emulsion containing about 3-8 weight percent of said seed kernel paste, along with about 3-8 weight percent gum acacia.

8. The process of claim 7 wherein substantially all of the fat content of said seed kernels is removed from said seed paste by solvent extraction and a reduced amount of said extracted seed oil subsequently reconstituted into the defatted seed meal paste.

9. The process of claim 8 wherein about 50 percent of the original fat content of the seed kernels is reconstituted into the seed kernel paste.

10. The clouding agent of claim 1 wherein in the hulls have also been removed from said seed kernels prior to grinding.

11. The clouding agent of claim 1 wherein said seed kernels have been defatted and debittered prior to grinding.

* * * * *